United States Patent
Wu

(10) Patent No.: US 7,587,522 B2
(45) Date of Patent: Sep. 8, 2009

(54) AUTOMATED SYSTEM AND METHOD FOR SETTING DEVICE MODULE LOADING SEQUENCE

(75) Inventor: Vincent Wu, Irvine, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 350 days.

(21) Appl. No.: 11/255,417

(22) Filed: Oct. 20, 2005

(65) Prior Publication Data

US 2007/0094421 A1 Apr. 26, 2007

(51) Int. Cl.
G06F 12/00 (2006.01)
(52) U.S. Cl. .................... 710/8; 710/15; 713/2; 714/47
(58) Field of Classification Search .................. 710/8, 710/10; 714/31, 36, 32; 713/1, 189, 2; 709/102, 709/220, 222, 226, 250
See application file for complete search history.

(56) References Cited

U.S. PATENT DOCUMENTS

| | | | | |
|---|---|---|---|---|
| 4,030,072 | A * | 6/1977 | Bjornsson | 714/31 |
| 5,819,107 | A * | 10/1998 | Lichtman et al. | 710/8 |
| 5,960,167 | A | 9/1999 | Roberts et al. | |
| 6,266,150 | B1 | 7/2001 | Brossman et al. | |
| 6,279,109 | B1 * | 8/2001 | Brundridge | 713/2 |
| 6,301,012 | B1 | 10/2001 | White et al. | |
| 6,349,304 | B1 | 2/2002 | Boldt et al. | |
| 6,728,907 | B1 * | 4/2004 | Wang et al. | 714/47 |
| 6,763,454 | B2 * | 7/2004 | Wilson et al. | 713/1 |
| 7,181,743 | B2 * | 2/2007 | Werme et al. | 718/104 |
| 2002/0133573 | A1 | 9/2002 | Matsuda et al. | |
| 2003/0014561 | A1 * | 1/2003 | Cooper | 709/321 |
| 2003/0121024 | A1 * | 6/2003 | Hill et al. | 717/107 |
| 2004/0105112 | A1 | 6/2004 | Ishihara et al. | |
| 2004/0263900 | A1 | 12/2004 | Nguyen et al. | |
| 2005/0046875 | A1 | 3/2005 | Gibson | |

(Continued)

OTHER PUBLICATIONS

D-Link, DP-301P+ Quick Installation Guide, 2003, D-Link, pp. 1-10.*

(Continued)

*Primary Examiner*—Henry W. H. Tsai
*Assistant Examiner*—Cheng-Yuan Tseng
(74) *Attorney, Agent, or Firm*—Tucker Ellis & West LLP

(57) ABSTRACT

A system and method for setting device module loading sequence. The hardware configuration of the document processing device is scanned and relevant configuration information is collected. Following collection of the relevant configuration information, document processing device system settings are then scanned. The current hardware configuration and the system settings are then input as module loading parameters. Module dependencies and module priorities are then gathered from the system settings and used to generate a module loading sequence table. The modules designated by the table are then loaded in accordance with the generated sequence. When a module loading error is detected, the error is recorded in an error log, viewable by a system administrator, and analyzed by an error handling module. The error handling module then determines whether to halt all loading progress until the error is resolved, or alternatively continues with the module loading while simultaneously generating error log data. Once all modules are loaded in accordance with the generated sequence table, the document processing device is ready to receive and process document processing requests.

14 Claims, 2 Drawing Sheets

U.S. PATENT DOCUMENTS

2005/0190392 A1 9/2005 Carroll
2005/0240821 A1* 10/2005 Martin ........................ 714/36
2005/0256939 A1 11/2005 Naismith et al.
2005/0278579 A1* 12/2005 Hill et al. ...................... 714/38
2006/0253894 A1* 11/2006 Bookman et al. .............. 726/2
2009/0037722 A1* 2/2009 Chong et al. ................... 713/2

OTHER PUBLICATIONS

D-Link DP-301P+ Pocket Size Print Server Manual, 2004, D-Link, pp. 1-73.*

Dennis, Microsoft Technet/MCSE Windows NT Workstation 4, 1999, Microsoft, pp. 1-53.*

* cited by examiner

AUTOMATED SYSTEM AND METHOD FOR SETTING DEVICE MODULE LOADING SEQUENCE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

This invention is directed to a system and method for setting device module loading sequence. More particularly, this invention is directed to a system and method for automatically configuring a device module loading sequence for a document processing device.

Document processing devices typically are comprised of various device modules which must be loaded and started in a determined sequence in order for the document processing device to function properly. The static configuration module associated with the document processing device is often used to load and start the devices modules for the device. Typically the static configuration module is set by the system administrator and is often the same for each device on the same network or maintained by the system administrator. However, using the static configuration for loading and starting the devices modules may result in the device memory or the central processing unit of the device to be overloaded. For example, the amount of memory on the device may be smaller than amount of memory required by the loading sequence specified by the system administrator, resulting in a memory overload during startup, halting the startup process. Further, if the hardware components and the system configuration for the devices are different, the loading sequence set by the system administrator may result in loading errors if the required components are not present. Therefore, there is a need for a system and method for setting device module loading sequence which results in the proper loading and starting of the device modules for a plurality of document processing devices.

The subject invention overcomes the above-mentioned problems and provides a system and method for setting device module loading sequence.

BRIEF SUMMARY OF THE INVENTION

In accordance with the present invention, there is provided a system and method for setting device module loading sequence.

Further, in accordance with the present invention, there is provided a system and method for automatically configuring a device module loading sequence for a document processing device.

Still further, in accordance with the present invention, there is provided a system and method for setting a device module loading sequence based on the existing hardware component configuration of the device and the device settings.

Still further, in accordance with the present invention, there is provided a system for setting device module loading sequence. The system includes means adapted for receiving device configuration data representative of a state of a plurality of device modules and retrieving sequencing data representative of at least one of a device module startup dependency and a device module startup priority among the device modules. The system also comprises means adapted for generating device startup data in accordance with the device configuration data and the sequencing data and testing the acceptability of a device startup sequence specified by the device startup data. The system further includes means adapted for monitoring and generating an error signal upon a determination of an error condition in the device startup sequence by the testing means.

Still further, in accordance with the present invention, there is provided a method for setting device module loading sequence. The method comprises the steps of receiving device configuration data representative of a state of a plurality of device modules and retrieving sequencing data representative of at least one of a device module startup dependency and a device module startup priority among the device modules. The method of the present invention also generates device startup data in accordance with the device configuration data and the sequencing data and tests the acceptability of a device startup sequence specified by the device startup data. The method further comprises the step of generating an error signal upon a determination of an error condition in the device startup sequence by the testing means.

Still other objects and aspects of the present invention will become readily apparent to those skilled in this art from the following description wherein there is shown and described a preferred embodiment of this invention, simply by way of illustration of one of the best modes suited for to carry out the invention. As it will be realized by those skilled in the art, the invention is capable of other different embodiments and its several details are capable of modifications in various obvious aspects all without from the invention. Accordingly, the drawing and descriptions will be regarded as illustrative in nature and not as restrictive.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE INVENTION

This invention is directed to a system and method for setting device module loading sequence. More particularly, this invention is directed to a system and method for automatically configuring a device module loading sequence for a document processing device. The system and method of the present invention set the device module loading sequence based on the existing hardware component configuration of the device and the device settings. In the preferred embodiment, as described herein, the document processing device is suitably an image generating device. Preferably, the image generating device is a multifunctional peripheral device, capable of providing scanning, copying, facsimile, printing, document management, document storage, electronic mail, and other functions to a user.

Figure 1:
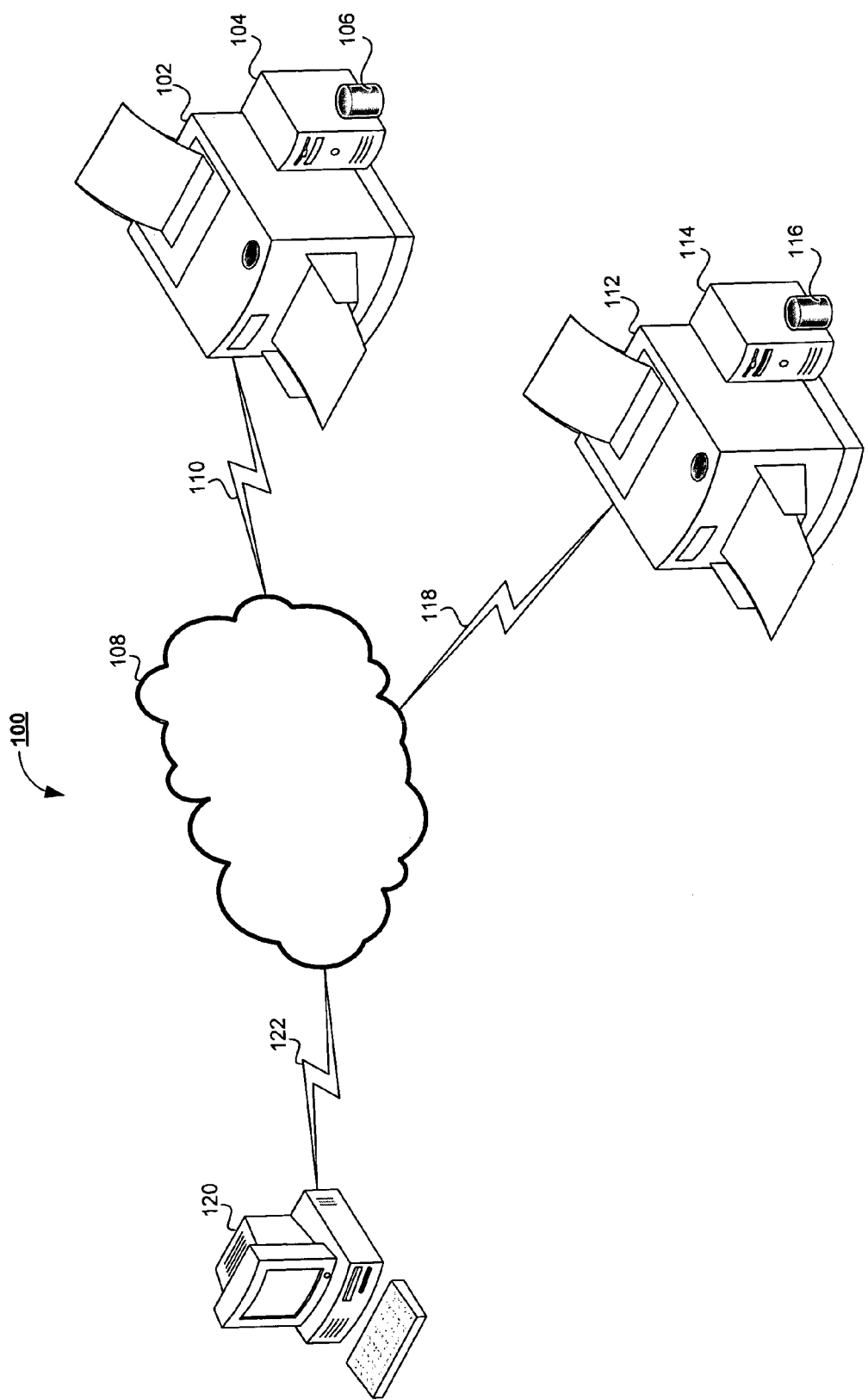
FIG. 1 is a block diagram of the system according to the present invention.

Referring now to FIG. 1, there is shown a block diagram illustrating a system 100 in accordance with the present invention. As shown in FIG. 1, the system suitably includes a plurality of document processing devices, illustrated in FIG. 1 as the document processing device 102 and document processing device 112. It will be appreciated by those skilled in the art the document processing devices 102 and 112 are advantageously represented in FIG. 1 as multifunction peripheral devices, suitably adapted to provide a variety of document processing services, such as, for example and without limitation, scanning, copying, facsimile, printing, and the like. Suitable commercially available image generating devices include, but are not limited to, the TOSHIBA e-Studio Series Controller. Communicatively coupled to the document processing device 102 is a controller 104. It will be appreciated by those skilled in the art that the depiction of the controller 104 as a separate component of the document processing device 102 is for example purposes only and any hardware, software, or combination thereof, integrated with the document processing device 102 is equally capable of functioning as the controller 104. The document processing device 112 also includes a controller 114 communicatively coupled to the document processing device 112, functioning in the same manner as the controller 104 associated with document processing device 102. It will be appreciated by those skilled in the art that although two document processing devices 102, 112 are illustrated in FIG. 1, the present invention is not limited to only two devices, but is applicable to any number of document processing devices, from a single device to a number of devices exceeding the two shown in FIG. 1.

As will be understood by those skilled in the art, the controllers 104, 114 are suitably adapted to control the functioning of the document processing devices 102, 112, respectively, providing processing, memory, and other imaging services, as are known in the art. The controllers 104 and 114 further include data storages 106 and 116, suitably adapted to retain system configuration information, fonts, programs, images, and the like. It will be understood by those skilled in the art that the data storages 106, 116 are any data storage device known in the art, including, without limitation, flash memory, magnetic data storage, optical data storage and the like. In accordance with a preferred embodiment of the present invention, the data storages 106, 116 further include data representative of administrative settings, manufacturer settings, and other device system settings. Preferably, the data storages 106 and 116 also include one or more modules, which contain hardware configurations, system settings, administrative parameters, dependencies, priorities and the like. For example, a facsimile module is capable of including a hardware component, such as turning on the facsimile engine, a system setting component, such as facsimile send only, an administrator parameter, such as log information, and a dependency/priority component, such as initiate image library, compression library, and the like.

The system 100 further includes a computer network 108, with which the document processing device 102 is in data communication, via a communication link 110. According to one aspect of the present invention, the document processing device 112 is also in data communication with the computer network 108 via a communication link 118. Preferably, the network 108 is any computer network known in the art capable of enabling communications between two or more electronic devices. As the skilled artisan will appreciate, the present invention is capable of being implemented on any such computer network, including for example and without limitation, a local area network, a wide area network, a personal area network, Token Ring network, Ethernet-based network, the Internet, intranets, and the like. Preferably, the communications links 110 and 118 are any communication channels known in the art capable of carrying data communications between two or more electronic devices. Suitable communications links include, but are not limited to, the public-switched telephone system, the Internet, local area networks, wide area networks, personal area networks, WIMAX, and the like.

In addition, the system 100 incorporates an administrative device 120, illustrated in FIG. 1 as a desktop computer. It will be appreciated by those skilled in the art that the administrative device 120 is any suitable electronic device adapted for communication and administrative control of the networked devices, including the document processing devices 102 and 112. The skilled artisan will further appreciate that the administrative device 120 is suitably adapted to provide a user-interface to an administrative user, whereby network access rights, privileges, and a device settings, are able to be loaded onto the networked devices, including the document processing devices 102 and 112. In one embodiment of the present invention, the administrative device 120 is instituted as two separate devices, each respectively coupled directly to the document processing devices 102 and 112, such as an internal component of the devices 102 and 112, accessible by an administrator via an associated integrated document processing devices 102 and 112 user-interfaces. Thus, the administrative user is able to input parameters, such as maintain a log, restricting access to functions, and the like, with respect to the document processing devices 102 and 112 via the administrative device 120.

In one embodiment, the administrative device 120 communicates with the document processing devices 102 and 112 via the computer network 108. In accordance with the present embodiment, the administrative device 120 establishes a communications link 122 with the computer network 108. Preferably, the communications link 122 is any suitable means of data communication known in the art, such as, for example and without limitation, wired and wireless communications channels.

Operation of the present invention will be described below with respect to a single document processing device 102 for ease of explanation. Those skilled in the art will appreciate that the following description is equally adapted to explain operation of the document processing device 112, without requiring changes thereto. Where differences occur, such occurrences are explained below, with respect to the document processing device 102 and the document processing device 112. In operation, the document processing device 102, associated controller 104, and the like, is activated. The hardware configuration of the document processing device, inclusive of the controller 104, is then scanned and relevant configuration information is collected. Suitably relevant configuration information includes, but is not limited to, central processing unit speed, system memory, hard disk drive, model type, print duplexer, and the like. Following collection of the relevant configuration information, document processing device system settings are then scanned. As will be appreciated by those skilled in the art, the system settings are capable of including, but are not limited to, document processing device 102 manufacturer settings, device 102 administrator settings, and the like. Preferably, the system settings are stored in the data storage 106 associated with the document processing device 102. More preferably, the data storage 106 is a flash memory, a hard disk drive, or other mass storage device. It will be appreciated by those skilled in the art that the hardware configuration settings of the document processing device 112 differ from those of the document processing device 102, thereby affecting the sequence loading of modules, discussed below.

The current hardware configuration and the system settings are then input into the controller 104 as module loading parameters in accordance with the present invention. Module dependencies and module priorities are then gathered from the system settings by the controller 104 and used to generate a module loading sequence table. It will be understood by those skilled in the art that the module in the sequence is capable of depending from the first module, or alternatively, a module, which other, higher level modules, require for their respective operations. For example, those skilled in the art will appreciate that a line printer daemon, a higher-level module, requires the prior activation of a job manager, a core module, the raster image processor manager, a core module, and a engine transport manager, also a core module. These core modules, in return, require that a messaging daemon infrastructure module, and a pre-startup infrastructure module, be previously activated. Those skilled in the art will appreciate that as hardware configurations and device settings are capable of differing with respect to the document processing devices 102 and 112, table organization and sequencing will differ accordingly. Thus, the document processing device 102 will initiate one particular module first, whereas the document processing device 112, for example, lacks the hardware necessary to implement the module first. Thereafter, the document processing device 112 initiates a different module first, according to the sequence that is calculated based upon the device 112 hardware configuration and device settings.

The modules designated by the table are then loaded by the controller 104 in accordance with the generated sequence. When a module loading error is detected, the error is recorded in an error log, viewable by a system administrator, and analyzed by an error handling module. The error handling module then determines whether to halt all loading progress until the error is resolved, or alternatively continues with the module loading while simultaneously generating error log data. It will be appreciated by those skilled in the art that the generation of the sequence loading table is advantageously accomplished so as to provide a startup sequence whereupon high priority modules are loaded first and dependent modules, i.e., modules requiring one or more other modules, are loaded only after the required modules have been loaded. Once all modules are loaded in accordance with the generated sequence table, the document processing device 102 is ready to receive and process document processing requests from client devices (not shown) via the computer network 102, or directly via a parallel port, USB port, Firewire port, portable storage device, and the like.

Figure 2:
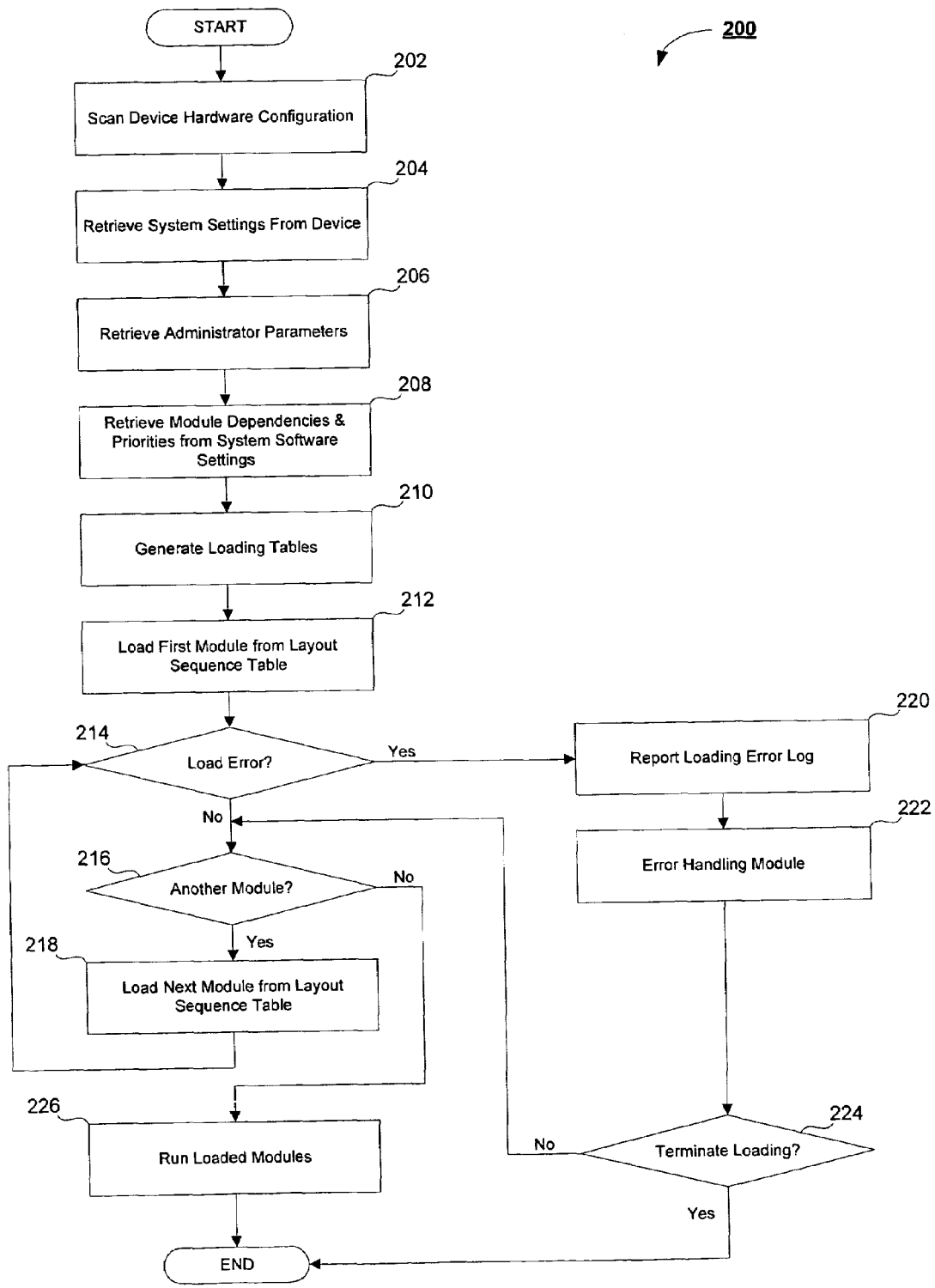
FIG. 2 is a flowchart illustrating a method for setting device module loading sequence in accordance with the present invention.

Turning now to FIG. 2, there is shown a flowchart 200 illustrating a method for setting a device module loading sequence in accordance with the present invention. As shown in FIG. 2, the method begins at step 202, wherein the document processing device 102 hardware configuration is scanned and the current hardware information is gathered. It will be appreciated by those skilled in the art that suitable hardware information includes, but is not limited to, processor speed, system memory size, hard disk space, model number, printer engine specifics, scanning optics, modem speed, network interface speeds, and the like. It will further be understood by those skilled in the art that the description of FIG. 2 is applied only to the document processing device 102 for explanation purposes only. The skilled artisan will appreciate that the hardware configuration of the document processing device 112 is capable of differing from that of the document processing device 102. In accordance thereof, the loading sequence table corresponding to the document processing device 112 diverges from the loading sequence table corresponding to the document processing device 102 based, in part, upon the divergent hardware configurations of the two devices 102, 112. Preferably, the document processing devices 102 and 112 use of the instant method enables both devices 102, 112 to startup quickly and efficiently, while employing different tables.

At step 204, the system settings are retrieved from the document processing device 102, including any manufacturer settings resident in the device 102. The skilled artisan will appreciate that the manufacturer settings include preset default values corresponding to document processing operations as are known in the art. Administrator set parameters, or settings, are then retrieved at step 206. It will be understood by those skilled in the art that administrator parameters include, but are not limited to, requiring log generation, displaying a particular user-interface, option selection, access restriction, user privileges, operations restrictions, and the like. In the preferred embodiment, the hardware configuration, system settings, and administrative settings are used as module loading parameters, i.e., used to assist in the determination of module loading dependencies and priorities.

At step 208, module dependencies and module priorities are gathered from the system software settings, administrative settings, and collected hardware configuration. It will be appreciated by those skilled in the art that the modules are capable of depending from other modules, which must be activated first, as well as having a higher priority than other modules of a similar type. At step 210, loading tables are generated reflecting the order of modules with respect to when each module is to be loaded. Those skilled in the art will further appreciate that the loading table is generated using the gathered information, including hardware configuration data reflecting the available system resources, administrative settings reflecting authorized processes, and manufacturer settings reflecting device capabilities. In one embodiment, the table is ordered such that similar operation modules, such as printing, scanning, facsimile, copying, and the like, are organized into groups.

The first module contained in the sequence table is then loaded at step 212. A determination is then made at step 214 whether a loading error has occurred, i.e., whether the module has successfully loaded. When no errors are detected, flow proceeds to step 216, wherein a determination is made whether additional modules remain in the table to be loaded. When an additional module does remain the sequence table, flow proceeds to step 218, whereupon the next module in the sequence table is loaded. Flow then returns to step 214 for a determination whether the next module has successfully loaded. Operations continue from there until no additional modules remain in the sequence table, as determined at step 216. When no additional modules remain in the sequence table, flow proceeds to step 226, whereupon the modules loaded are run and the document processing device 102 is ready to receive and process document processing requests. For example, when the next module in the loading table sequence depends from the first module, i.e., is a higher-level module that requires the first module, an infrastructure or core module, be in operation, it is positioned in the table to be initiated only after the designated modules have been loaded. Thus, when the higher-level module is a copy module, which requires the prior activation of a copy job manager core module, the copy raster image processing module, and the like, the higher-level copy module is located after the required modules in the table, whereby those required modules are loaded first.

When a load error is detected at step 214, irrespective of the particular module that failed to be successfully loaded, flow proceeds to step 220, whereupon the error is reported in a loading error log. An error handling module then receives notification of the error at step 222, including the module name, dependencies, and other relevant information, as will be appreciated by those skilled in the art. A determination is then made at step 224 by the error handling module whether to terminate the module loading. When it is determined at step 224 to terminate module loading, the process terminates. When the error handling module determines at step 224 to continue the loading process, irrespective of the detected loading error, flow returns to step 216, wherein a determination is made whether any additional modules remain in the sequence table. When additional modules remain to be loaded, flow proceeds as indicated above. When no additional modules remain, the modules thus loaded are operated and the document processing device 102 is ready for document processing operations.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a storage medium such as ROM or RAM, optical recording media such as CD-ROM or magnetic recording media such as floppy discs. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for setting a device module loading sequence for startup of a document processing device, operating on a processing device having instructions stored in an associated storage medium and operable on an associated processor, comprising:

means for receiving device configuration data from a data storage on an associated document processing device, which device configuration data is representative of a state of a plurality of device modules associated with the document processing device;

means for receiving system data corresponding to hardware resources associated with the document processing device;

means for receiving resource data corresponding to hardware resources used in connection with startup characteristics associated with an initial loading of each of the plurality of device modules, the hardware resources including at least one of memory required and processor power required corresponding to a loading of each of the plurality of device modules;

means for retrieving sequencing data representative of at least one of a device module startup dependency relative to at least a second device module of the plurality thereof and a device module startup priority among the device modules during initial loading thereof;

means for generating device startup data in accordance with the device configuration data, the system data, the hardware resource data and the sequencing data;

testing means for testing acceptability of a device startup sequence specified by the device startup data;

monitoring means for generating an error signal upon a determination of an error condition in the device startup sequence by the testing means;

means for reordering the device startup sequence in accordance with an output of the monitoring means so as to alter the device startup data;

means for storing the startup data in an associated data storage;

means for loading the startup data prior to commencement of a startup operation;

means for completing a startup operation of the plurality of device modules disposed in the document processing device in accordance with the reordered loaded startup data; and means for receiving, for processing, electronic document data into the document processing device after completion of the startup sequence.

2. The system for setting a device module loading sequence of claim 1 further comprising means for receiving configuration data from at least one of a document processing device and a system administrator.

3. The system for setting a device module loading sequence of claim 2 further comprising means for determining severity of an error condition and means adapted for selectively aborting a device startup sequence in accordance with a determined severity.

4. The system for setting a device module loading sequence of claim 3 further comprising reporting means for generating a report of error conditions in the device startup sequence.

5. The system for setting device module loading sequence of claim 4 further comprising means for transmitting the report of error conditions to at least one of a system administrator and an associated storage medium.

6. The system for setting device module loading sequence of claim 1 further comprising means for storing the device startup data in an associated storage medium.

7. The system for setting device module loading sequence of claim 6 wherein the device startup data is stored in a table format.

8. A method for setting a device module loading sequence for starting of a document processing device, comprising the steps of:

receiving device configuration data from a data storage on an associated document processing device, which device configuration is representative of a state of a plurality of device modules associated with the document processing device;

receiving resource data corresponding to hardware resources used in connection with startup characteristics associated with an initial loading of each of the plurality of device modules, the hardware resources including at least one of memory required and processor power required corresponding to a loading of each of the plurality of device modules;

retrieving sequencing data representative of at least one of a device module startup dependency relative to at least a second device module of the plurality thereof and a device module startup priority among the device modules during initial loading thereof;

generating device startup data in accordance with the device configuration data, the system data, the hardware resource data, and the sequencing data;

testing acceptability of a device startup sequence specified by the device startup data;

generating an error signal upon a determination of an error condition in the device startup sequence by the testing step;

reordering the device startup sequence in accordance with an output of an error signal so as to alter the device startup data;

storing the startup data in an associated data storage;

loading the startup data prior to commencement of a startup operation;

completing a startup operation of the plurality of device modules disposed in a document processing device in accordance with the reordered loaded startup data; and receiving, for processing, electronic document data into the document processing device after completion of the startup sequence.

9. The method for setting a device module loading sequence of claim 8 further comprising the step of receiving configuration data from at least one of a document processing device and a system administrator.

10. The method for setting a device module loading sequence of claim 9 further comprising the step of determining severity of an error condition and for selectively aborting a device startup sequence in accordance with a determined severity.

11. The method for setting a device module loading sequence of claim 10 further comprising generating a report of error conditions in the device startup sequence.

12. The method for setting device module loading sequence of claim 11 further comprising the step of transmitting the report of error conditions to at least one of a system administrator and an associated storage medium.

13. The method for setting device module loading sequence of claim 8 further comprising the step of storing the device startup data in an associated storage medium.

14. The method for setting device module loading sequence of claim 13 wherein the device startup data is stored in a table format.

* * * * *

UNITED STATES PATENT AND TRADEMARK OFFICE
CERTIFICATE OF CORRECTION

PATENT NO. : 7,587,522 B2 Page 1 of 1
APPLICATION NO. : 11/255417
DATED : September 8, 2009
INVENTOR(S) : Vincent Wu It is certified that error appears in the above-identified patent and that said Letters Patent is hereby corrected as shown below:

In Claim 5, Column 8, Line 50, please replace "The system for setting device module loading sequence" with --The system for setting a device module loading sequence--.

In Claim 6, Column 8, Line 54, please replace "The system for setting device module loading sequence" with --The system for setting a device module loading sequence--.

In Claim 7, Column 8, Line 57, please replace "The system for setting device module loading sequence" with --The system for setting a device module loading sequence--.

In Claim 12, Column 10, Line 16, please replace "The method for setting device module loading" with --The method for setting a device module loading--.

In Claim 13, Column 10, Line 20, please replace "The method for setting device module loading" with --The method for setting a device module loading--.

In Claim 14, Column 10, Line 23, please replace "The method for setting device module loading" with --The method for setting a device module loading--.

Signed and Sealed this

Seventeenth Day of November, 2009

David J. Kappos
*Director of the United States Patent and Trademark Office*